(12) United States Patent
Qian et al.

(10) Patent No.: US 10,789,255 B2
(45) Date of Patent: Sep. 29, 2020

(54) PRESENTING DATA CHUNKS FOR A WORKING MEMORY EVENT

(71) Applicant: LENOVO (Singapore) PTE. LTD., New Tech Park (SG)

(72) Inventors: Ming Qian, Cary, NC (US); John Weldon Nicholson, Cary, NC (US); David Alexander Schwarz, Morrisville, NC (US); Song Wang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 254 days.

(21) Appl. No.: 15/936,971

(22) Filed: Mar. 27, 2018

(65) Prior Publication Data
US 2019/0303483 A1 Oct. 3, 2019

(51) Int. Cl.
*G06F 16/2457* (2019.01)
*G06F 16/242* (2019.01)
*G06F 3/01* (2006.01)
*G10L 15/22* (2006.01)
*G10L 25/51* (2013.01)

(52) U.S. Cl.
CPC ...... *G06F 16/24575* (2019.01); *G06F 16/243* (2019.01); *G06F 3/013* (2013.01); *G10L 15/22* (2013.01); *G10L 2015/223* (2013.01)

(58) Field of Classification Search
CPC .................. G10L 25/30; G06F 3/011–013
USPC ....................................................... 707/771
See application file for complete search history.

(56) References Cited

U.S. PATENT DOCUMENTS

| | | | | |
|---|---|---|---|---|
| 8,287,281 | B2* | 10/2012 | Karkanias | G09B 7/02 434/236 |
| 9,443,037 | B2* | 9/2016 | Abbott, III | G06F 16/40 |
| 2002/0095490 | A1* | 7/2002 | Barker | H04L 67/34 709/224 |
| 2007/0260361 | A1* | 11/2007 | Etcheson | G07C 5/008 701/1 |
| 2008/0114714 | A1* | 5/2008 | Vemuri | G06Q 10/109 706/48 |
| 2009/0313187 | A1* | 12/2009 | Miller | G06Q 10/04 706/11 |
| 2010/0145479 | A1* | 6/2010 | Griffiths | G01D 21/00 700/17 |

(Continued)

FOREIGN PATENT DOCUMENTS

WO WO-2012035119 A1 * 3/2012 ............. G06F 19/00

OTHER PUBLICATIONS

Guo et al., "Enhancing Memory Recall via an Intelligent Social Contact Management System", IEEE Transactions on Human-Machine System, vol. 44, No. 1, Feb. 2014, pp. 78-91. (Year: 2014).*

(Continued)

*Primary Examiner* — Phuong Thao Cao
(74) *Attorney, Agent, or Firm* — Kunzler Bean & Adamson

(57) ABSTRACT

For presenting data chunks for a working memory event, a processor detects a trigger policy for a working memory event being satisfied by raw data from a sensor. The trigger policy is based on user attention. The processor further categorizes a data chunk for the working memory event from the raw data. The processor detects a query policy being satisfied by a query from subsequent raw data. In response to the query policy being satisfied, the processor (Continued)

identifies the data chunk based on the query. The processor further presents the data chunk.

18 Claims, 11 Drawing Sheets

(56) References Cited

U.S. PATENT DOCUMENTS

| | | | | |
|---|---|---|---|---|
| 2011/0021178 A1* | 1/2011 | Balasaygun | ............ | G10L 17/26 455/413 |
| 2011/0231767 A1* | 9/2011 | Russell | ................ | G06Q 30/02 715/733 |
| 2011/0237287 A1* | 9/2011 | Klein | ................ | H04M 3/42178 455/521 |
| 2012/0158161 A1* | 6/2012 | Cohn | ................ | G08B 29/02 700/90 |
| 2013/0138591 A1* | 5/2013 | Ricci | ................ | B60W 50/0098 706/46 |
| 2014/0167954 A1* | 6/2014 | Johnson | ................ | H04W 76/10 340/539.11 |
| 2014/0184422 A1* | 7/2014 | Mensinger | ............ | A61B 5/7264 340/870.02 |
| 2014/0267313 A1* | 9/2014 | Marsella | ................ | G06T 13/40 345/474 |
| 2015/0286285 A1* | 10/2015 | Pantelopoulos | .......... | G09G 5/10 345/156 |
| 2015/0338912 A1* | 11/2015 | Kim | .................... | H04N 9/8205 345/520 |
| 2015/0339911 A1* | 11/2015 | Coyne | .................... | G08B 21/02 340/517 |
| 2015/0350331 A1* | 12/2015 | Kumar | .................... | H04L 67/04 709/217 |
| 2016/0021040 A1* | 1/2016 | Frei | ..................... | H04L 12/2809 709/206 |
| 2016/0057162 A1* | 2/2016 | Merza | ................ | H04L 63/1416 726/23 |
| 2016/0224804 A1* | 8/2016 | Carasso | ................ | G06F 3/0484 |
| 2016/0307173 A1* | 10/2016 | Chauhan | ................ | G06F 16/26 |
| 2017/0078238 A1* | 3/2017 | Huang | .................... | H04L 51/32 |
| 2017/0185756 A1* | 6/2017 | Poornachandran | ..... | G06F 21/10 |
| 2017/0186293 A1* | 6/2017 | Rabb | .................... | H04L 12/1895 |
| 2017/0311053 A1* | 10/2017 | Ganjam | ............. | G06K 9/00671 |
| 2018/0068540 A1* | 3/2018 | Romanenko | ........ | G06K 9/00771 |
| 2018/0232056 A1* | 8/2018 | Nigam | .................... | G06F 3/167 |
| 2019/0287323 A1* | 9/2019 | Ramic | ................ | G07C 5/0833 |

OTHER PUBLICATIONS

Bayen et al., "Evaluating the Effectiveness of a Memory Aid System", Gerontology, 2013, vol. 59, No. 1, pp. 77-84. (Year: 2013).*

* cited by examiner

300

| Current Raw Data 305 |
| Current Categorization 310 |
| Prediction Threshold 315 |
| Retention Interval 320 |
| Trigger Policy 325 |
| Query Policy 330 |
| Baseline Voiceprint 335 |
| Area of Interest 340 |
| Motion Vector 345 |
| Query 350 |

PRESENTING DATA CHUNKS FOR A WORKING MEMORY EVENT

FIELD

The subject matter disclosed herein relates to presenting data chunks and more particularly relates to presenting data chunks for a working memory event.

BACKGROUND

Users often have thoughts or encounter information that are quickly forgotten.

BRIEF SUMMARY

An apparatus for presenting data chunks for a working memory event is disclosed. The apparatus includes a sensor, a processor, and a memory that stores code executable by the processor. The processor detects a trigger policy for a working memory event being satisfied by raw data from the sensor. The trigger policy is based on user attention. The processor further categorizes a data chunk for the working memory event from the raw data. The processor detects a query policy being satisfied by a query from subsequent raw data. In response to the query policy being satisfied, the processor identifies the data chunk based on the query. The processor further presents the data chunk. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
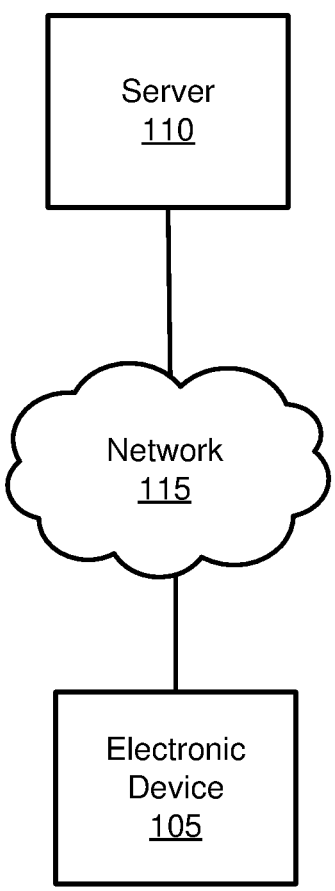
FIG. 1A is a schematic block diagram illustrating one embodiment of a working memory event system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a working memory event system 100. The system 100 may retain and present data chunks for working memory events. As used herein, a working memory event occurs when a user acquires information that the user wishes to remember. Typically, the user remembers the information in the brain's working memory until the information is either encoded in long-term memory, recorded outside of the brain, or forgotten. Unfortunately, information in working memory is frequently forgotten.

The embodiments described herein detect a working memory event, categorize a data chunk for the working memory event, detect a subsequent query for the data chunk, and present the data chunk for the working memory event. As a result, the working memory event is retained and subsequently accessible by the user even when the information of the working memory event is forgotten by the user.

The working memory event system 100 may include an electronic device 105, a server 110, and a network 115. The electronic device 105 may be a mobile telephone, a computer, a data appliance, and the like. In one embodiment, the electronic device 105 is in communication with the network 115. The network 115 may be the Internet, a mobile telephone network, a local area network, a wide-area network, a Wi-Fi network, or combinations thereof. The electronic device 105 may communicate with one or more servers 110 via the network 115. The server 110 may perform processing functions for the electronic device 105.

The electronic device 105 may be in the possession of the user. In addition, the electronic device 105 may be positioned in the user's environment. As a result, the electronic device 105 may detect working memory events.

Figure 1B:
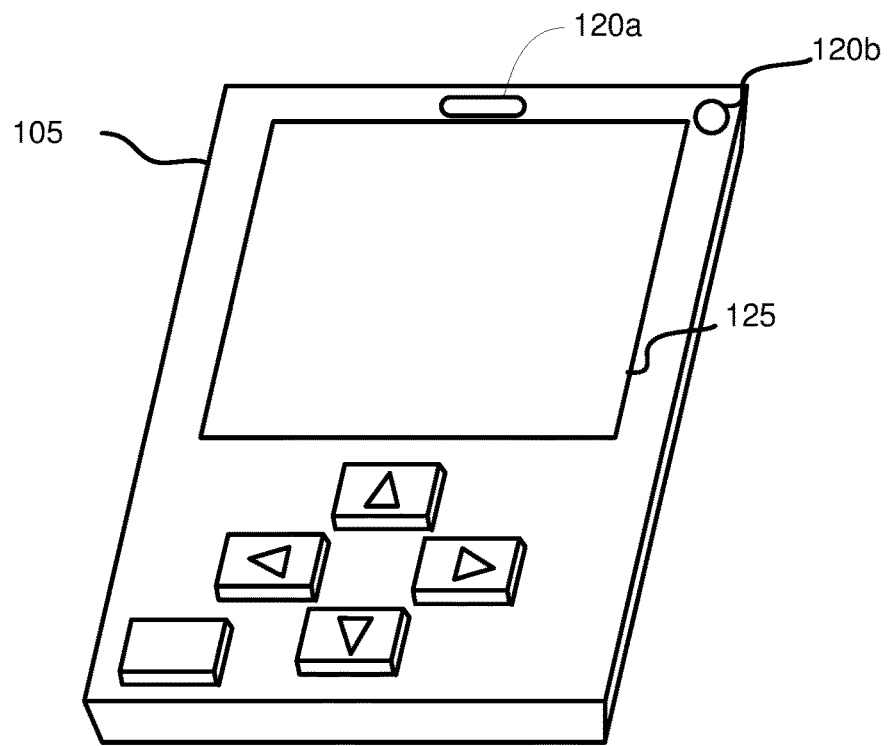
FIG. 1B is a perspective drawing illustrating one embodiment of an electronic device.

FIG. 1B is a perspective drawing illustrating one embodiment of an electronic device 105. In the depicted embodiment, the electronic device 105 is a video data appliance. The electronic device 105 may present information on a display 125. In addition, the electronic device 105 may include one or more sensors 120 such as the camera sensor 120b and/or a microphone sensor 120a. In one embodiment, the sensors 120a-b captures raw data when directed by the user. Alternatively, the sensors 120a-b may continuously capture raw data.

Figure 1C:
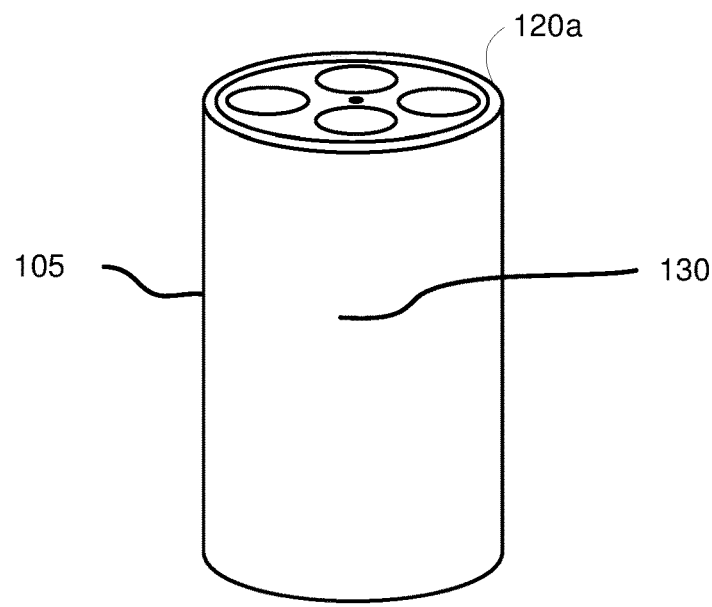
FIG. 1C is a perspective drawing illustrating one embodiment of an electronic device.

FIG. 1C is a perspective drawing illustrating one embodiment of an electronic device 105. In the depicted embodiment, the electronic device 105 is an audio data appliance. The electronic device 105 may present information through a speaker 130. In the depicted embodiment, the electronic device 105 includes a microphone sensor 120a.

Figure 1D:
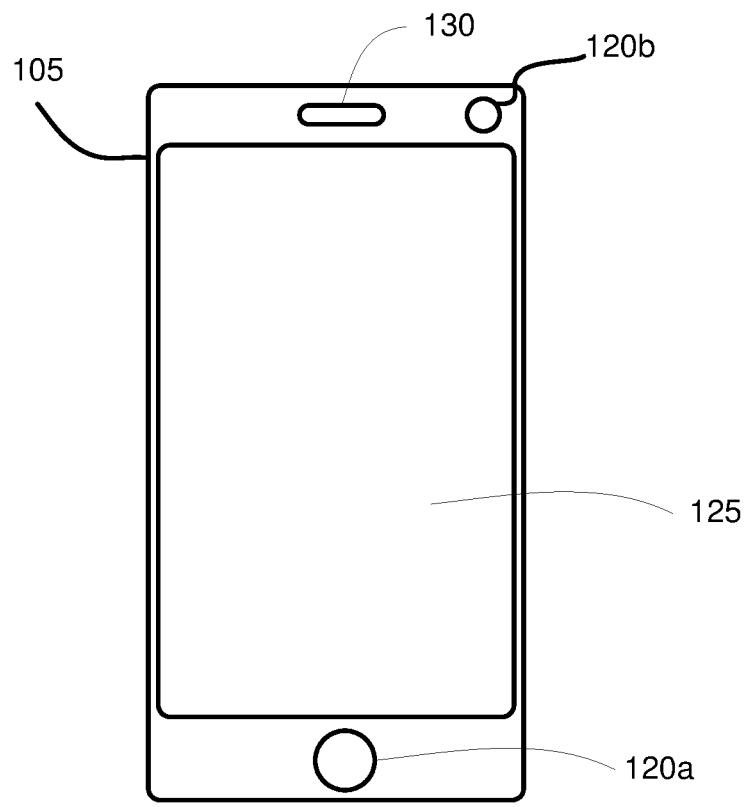
FIG. 1D is a front view drawing illustrating one embodiment of an electronic device.

FIG. 1D is a front view drawing illustrating one embodiment of an electronic device 105. In the depicted embodiment, the electronic device 105 is a mobile telephone. The electronic device 105 may receive raw data through a camera sensor 120b and/or a microphone sensor 120a. The electronic device 105 may further present information through a display 125 and/or speaker 130.

Figure 1E:
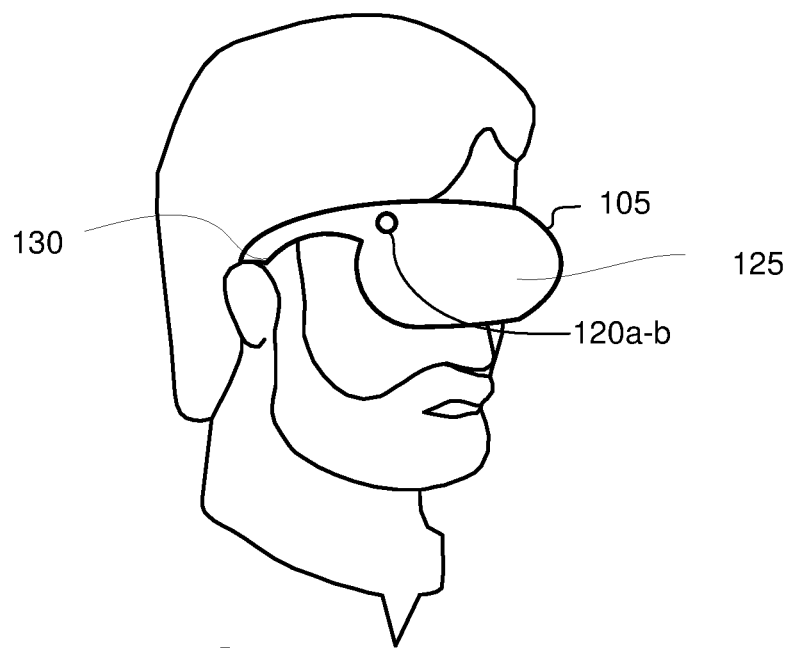
FIG. 1E is a perspective drawing illustrating one embodiment of an electronic device.

FIG. 1E is a perspective drawing illustrating one embodiment of an electronic device 105. In the depicted embodiment, the electronic device 105 is smart glasses. The electronic device 105 may receive raw data through a camera sensor 120b and/or a microphone sensor 120a. The electronic device 105 may further present information through a display 125 and/or speaker 130.

Figure 2A:
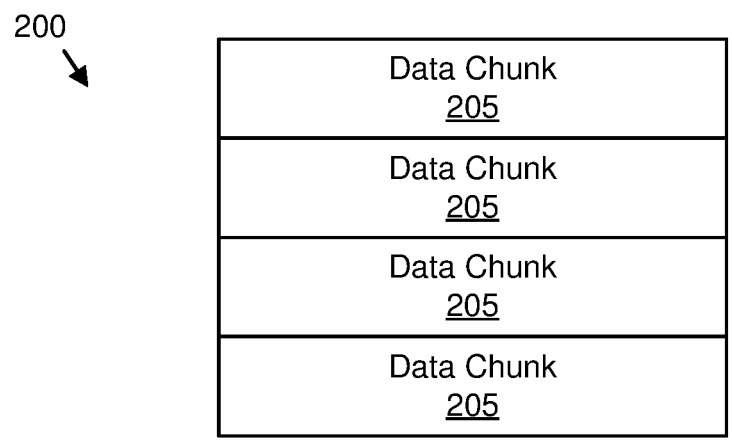
FIG. 2A is a schematic block diagram illustrating one embodiment of a data chunk database.

FIG. 2A is a schematic block diagram illustrating one embodiment of a data chunk database 200. The data chunk database 200 may be organized as a data structure in a memory. The data chunk database 200 may store a plurality of data chunks 205 as will be described hereafter in FIG. 2B.

Figure 2B:
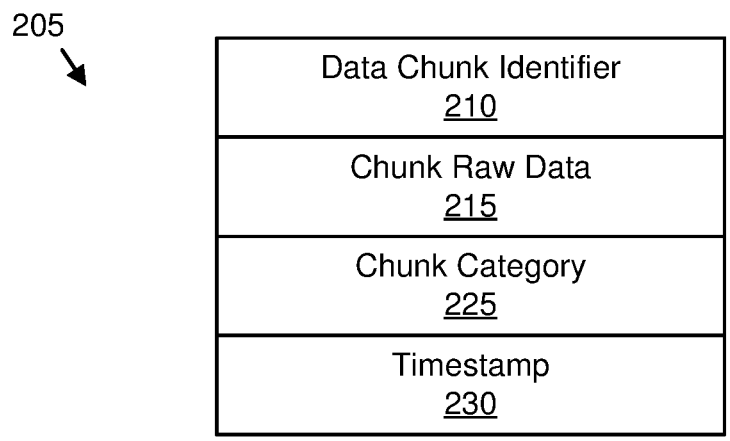
FIG. 2B is a schematic block diagram illustrating one embodiment of a data chunk.

FIG. 2B is a schematic block diagram illustrating one embodiment of the data chunk 205. The data chunk 205 may record a working memory event. In the depicted embodiment, the data chunk 205 includes a data chunk identifier 210, chunk raw data 215, a chunk category 225, and a timestamp 230.

The data chunk identifier 210 may identify the data chunk 205 in the data chunk database 200. The chunk raw data 215 may record the raw data output of the sensor 120.

The chunk category 225 may categorize the data chunk 205. In addition, the chunk category 225 may categorize the working memory event. Table 1 lists some exemplary chunk categories 225 and is in no way limiting.

TABLE 1

Number
Name
Address
Phone number
Page number
Media title
Time
Date
Travel destination
Sale destination
Web site
Product type
Product model
Sequence of steps
Sequence of commands
Restaurant
Recreation site
Directions The timestamp 230 may record when the trigger policy for the working memory event was satisfied. In addition, the timestamp 230 may record when the data chunk 205 is created.

Figure 3:
FIG. 3 is a schematic block diagram illustrating one embodiment of system data.

FIG. 3 is a schematic block diagram illustrating one embodiment of system data 300. The system data 300 may store information related to the detection of a working memory event, the creation and categorization of the data chunk 205, and the detection of a query for the data chunk 205. The system data 300 may be organized as a data structure in a memory. In the depicted embodiment, the system data 300 includes current raw data 305, a current categorization 310, a prediction threshold 315, a retention interval 320, a trigger policy 325, a query policy 330, a baseline voice print 335, an area of interest 340, and a motion vector 345.

The current raw data 305 may include the raw data output of the sensor 120. In one embodiment, the current raw data 305 is buffered for an analysis time interval such as 30 seconds. The current raw data 305 may be analyzed to determine the current categorization 310. The current categorization 310 may predict information that is needed by a user based on the user's conversation, actions, and/or attention. The user's actions may be determined from the motion vector 345. The user's attention may be determined from the user's field of view. In one embodiment, the field of view is determined by eye tracking with the sensor 120.

The prediction threshold 315 may be used to predict that the query policy 330 is satisfied. In one embodiment, the query policy 330 is satisfied if the first data chunk 205 exceeds the prediction threshold 315.

The retention interval 320 may be a time interval that specifies how long a data chunk 205 and the associated working memory event is retained. The time interval may be measured from the present. In one embodiment, a data chunk 205 is archived when the timestamp 230 of the data chunk 205 exceeds the retention interval 320. As a result, a data chunk 205 may only be retained for a limited time.

The trigger policy 325 may determine when a working memory event is detected. The working memory event may be detected in response to the trigger policy 325 being satisfied by the chunk raw data 215 and/or current raw data 305 from the sensor 120. The trigger policy 325 may be based on user attention.

In one embodiment, the user attention is determined from the field of view of the camera sensor 120b. For example, the electronic device 105 may be smart glasses and the field-of-view of the camera sensor 120b may be the user attention. In one embodiment, the field-of-view is recorded as the area of interest 340. In addition, the camera sensor 120b may track the user's eye movements and further determine the user attention within the field-of-view. For example, the area of interest 340 may be within a cone extending from the user's eye with an angle in the range of 5 to 15°.

In one embodiment, the trigger policy 325 is satisfied in response to detecting an extended visual focus user attention. The extended visual focus attention may be the area of interest 340 including an object for greater than an extended visual time interval. For example, if the area of interest 340 encompasses the object for greater than the extended visual time interval, the trigger policy 325 may be satisfied. The extended visual time interval may be greater than three seconds.

In one embodiment, the trigger policy 325 is satisfied in response to detecting the extended visual focus user attention while the user is moving. The motion vector 345 may record user movement and/or movement of the electronic device 105. The user may be determined to be moving if the motion vector 345 is greater than a motion threshold. The motion threshold may be in the range of 20-40 centimeters (cm) per second.

In one embodiment, the user attention is determined from repetition. For example, a phrase that is repeated by the user may be determined to be the user attention. The trigger policy 325 may be satisfied in response to detecting a repeated phrase.

In a certain embodiment, the user attention is determined from spoken emphasis. For example, a phrase that is spoken with an emphasis that deviates from the baseline voice print 335 of the user may be determined to be the user attention. The trigger policy 325 may be satisfied in response to detecting a phrase spoken with emphasis.

The query policy 330 may determine when a user is querying for the data chunk 205 of a working memory event. In one embodiment, the query policy 330 is satisfied in response to detecting a query phrase in a query 350 from the current raw data 305. For example, the user may query "what was that?" Table 2 lists some exemplary query phrases that may be employed and is in no way limiting.

TABLE 2

What was . . .
What was that . . .
Remind me
Where is . . .
Access . . .

In addition, the query policy 330 may be satisfied in response to detecting the query phrase and a chunk category 225. For example, the user may query "what was that number?"

In one embodiment, the query policy 330 is satisfied in response to determining a chunk category 225 of a first data chunk 205 of a plurality of data chunks 205 matches the current categorization 310 and that the first data chunk 205 exceeds the prediction threshold 315 as will be described hereafter in FIG. 5C.

The baseline voiceprint 335 may be established from the user's speech. The baseline voiceprint 335 may indicate average emphasis, intonation, and frequency range of the user's speech. The motion vector 345 may record the motion of the user and/or electronic device 105. The query 350 may be recorded from the current raw data 350. The query 350 may satisfy the query policy 330.

Figure 4A:
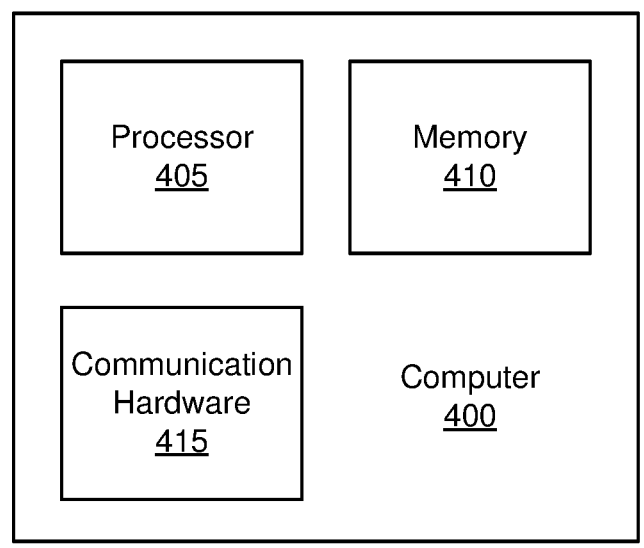
FIG. 4A is a schematic block diagram illustrating one embodiment of a computer.

FIG. 4A is a schematic block diagram illustrating one embodiment of a computer 400. The computer 400 may be embodied in the electronic devices 105 and the server 110. In the depicted embodiment, the computer 400 includes a processor 405, a memory 410, and communication hardware 415. The memory 410 may comprise a semiconductor storage device, a hard disk drive, an optical storage device, a micromechanical storage device, or combinations thereof. The memory 410 may store code. The processor 405 may execute the code. The communication hardware 415 may communicate with other devices and/or the network 115.

Figure 4B:
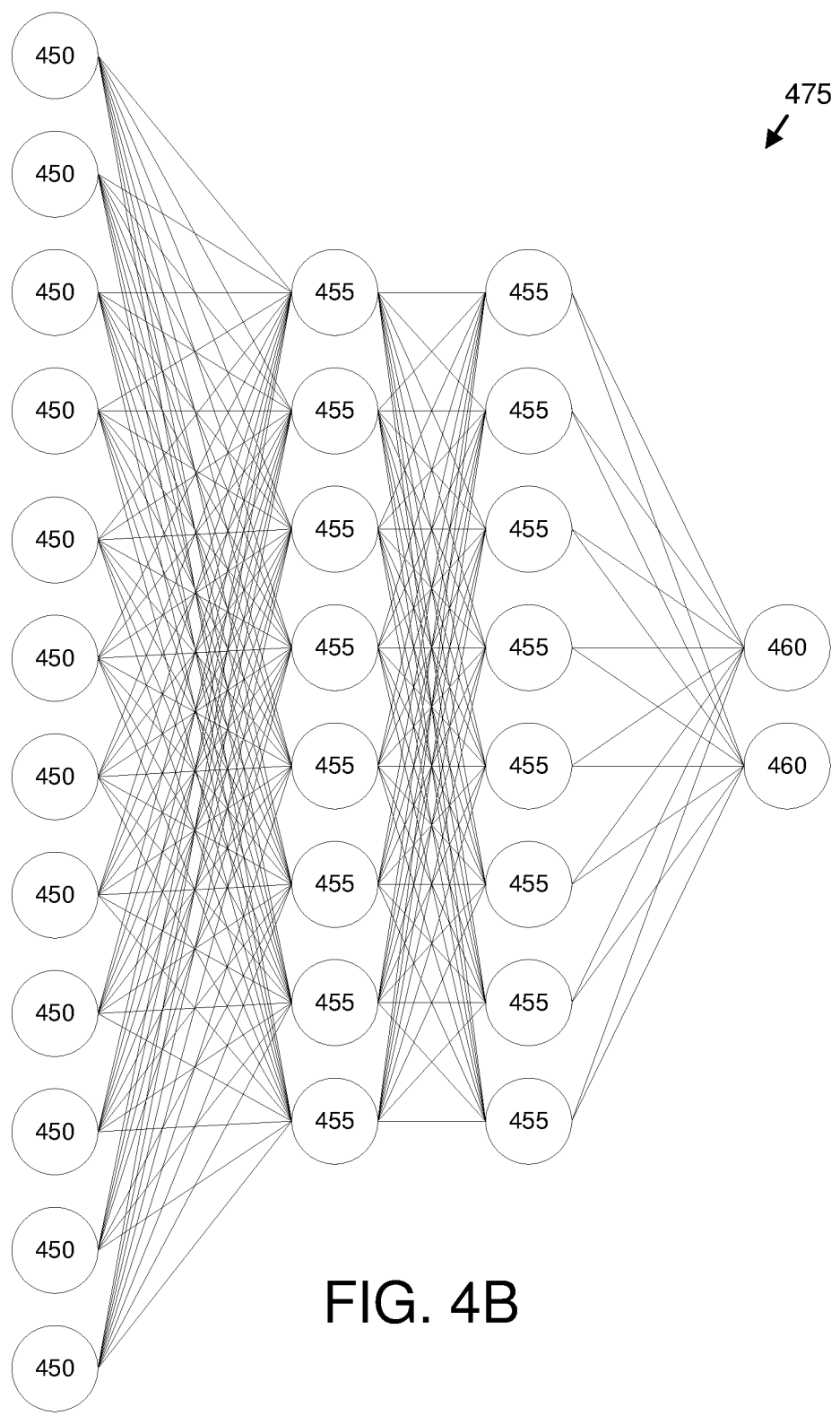
FIG. 4B is a schematic diagram illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, and the like.

The neural network 475 may be trained with training data. The training data may include current raw data 305 and associated satisfactions of the query policy 330. In addition, the training data may include chunk raw data 215 and associated chunk categories 225. In one embodiment, the training data includes the current raw data 305 and associated current categorizations 310. In a certain embodiment, the training data includes a plurality of chunk categories 225, a plurality of current categorizations 310, and associated prediction threshold outcomes.

The neural network 475 may be trained using one or more learning functions while applying the training data to the input neurons 450 and known result values for the output neurons 460. Subsequently, the neural network 465 may receive actual data at the input neurons 450 and make predictions at the output neurons 460 based on the actual data. The actual data may include data from the current raw data 305 and the predictions may be chunk categories 225, current categorizations 310, trigger policy outcomes, prediction threshold outcomes, and/or query policy outcomes.

Figure 5A:
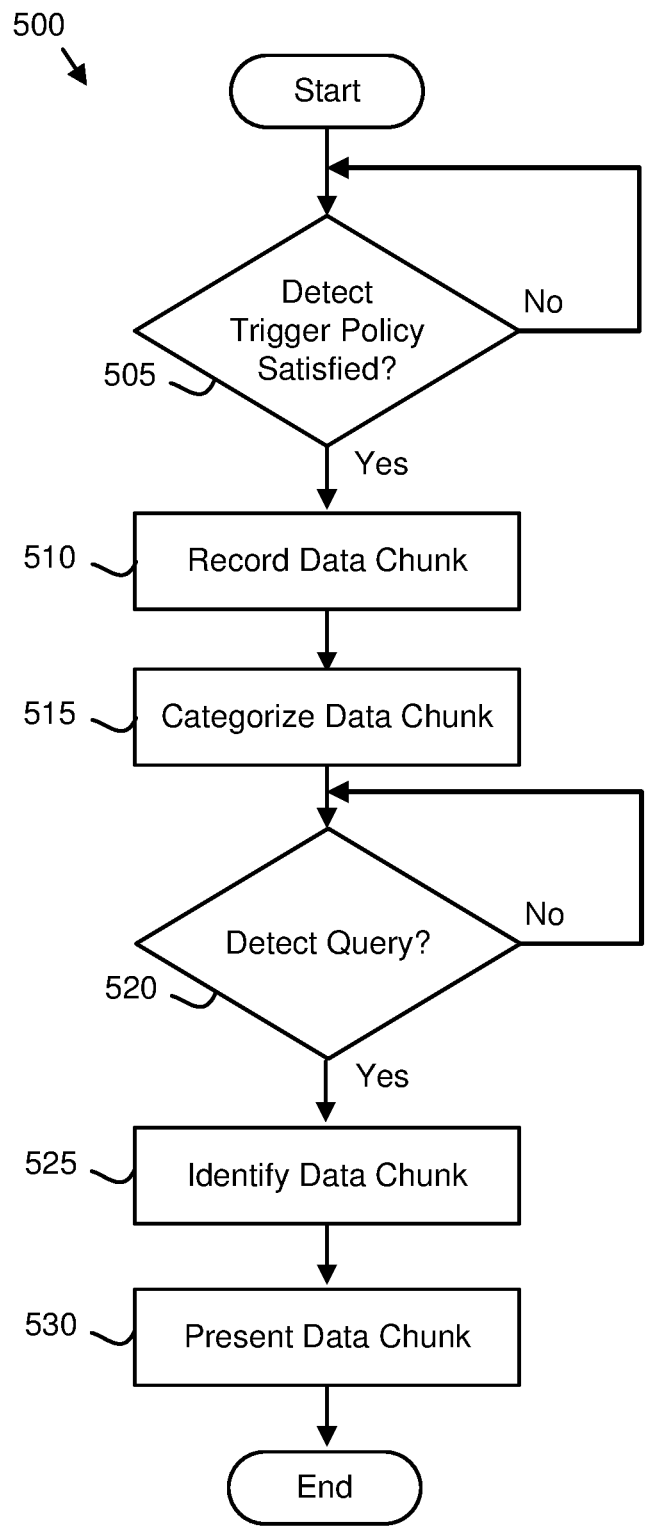
FIG. 5A is a schematic flow chart diagram illustrating one embodiment of a data chunk presentation method.

FIG. 5A is a schematic flow chart diagram illustrating one embodiment of a data chunk presentation method 500. The method 500 may detect that the trigger policy 325 for a working memory event is satisfied, categorize the data chunk 205 for the working memory event, and identify the data chunk 205 for a query 350. The method 500 may be performed by the processor 405.

The method 500 starts, and in one embodiment, the processor 405 detects 505 the trigger policy 325 for a working memory event been satisfied by raw data from the sensor 120 such as the current raw data 305. The trigger policy 325 a be satisfied in response to detecting 505 one or more of a repeated phrase, a phrase spoken with emphasis, an extended visual focus on an object, and the extended visual focus on the object while the user is moving. The processor 405 may continually monitor for the trigger policy 325 being satisfied and continue to monitor if the trigger policy 325 is not satisfied.

If the trigger policy 325 is satisfied, the processor 405 may record 510 the data chunk 205. In one embodiment, the data chunk 205 may be created in the data chunk database 200. The current raw data 305 may be recorded as the chunk raw data 215. A current time may also be recorded as the timestamp 230.

The processor 405 may categorize 515 the data chunk 205 for the working memory event from the chunk raw data 215 with a chunk category 225. The processor 405 may vectorize text from the chunk raw data 215 to identify the chunk category 225 from a list of categories. In one embodiment, the processor 405 may employ the neural network 475 to categorize 515 the data chunk 205.

The processor 405 may further detect 520 the query policy 330 being satisfied by a query 350 from subsequent current raw data 305. In one embodiment, the processor 405 detects 520 the query policy 330 being satisfied by converting the current raw data 305 to text. The processor 405 may further vectorize the text, identify the query 350 from the vectorized text, and determine if the query 350 satisfies the query policy 330. The detecting 520 that the query policy 330 is been satisfied is described in more detail in FIG. 5C.

The processor 405 may continually monitor to detect 520 the query policy 330 being satisfied. If the query policy 330 being satisfied is not detected 520, the processor 405 may continue to monitor.

If the query policy 330 is satisfied, the processor 405 may identify 525 a data chunk 205 from the data chunk database 200 based on the query 350. In one embodiment, the processor 405 identifies 525 the data chunk 205 by determining the current categorization 310 of the current raw data 305 and matching a chunk category 225 of the data chunk 205 in the data chunk database 200 to the current categorization 310.

The processor 405 may present 530 the data chunk 205 to the user and the method 500 ends. The data chunk 205 may be formatted and presented through the display 125 and/or the microphone 130.

Figure 5B:
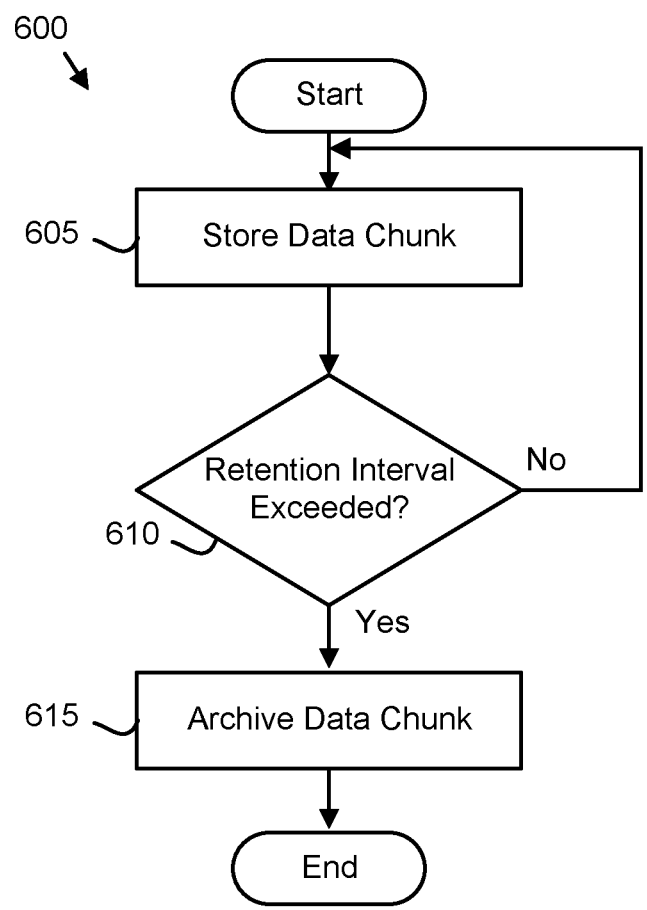
FIG. 5B is a schematic flow chart diagram illustrating one embodiment of a data chunk retention method.

FIG. 5B is a schematic flow chart diagram illustrating one embodiment of a data chunk retention method 600. The method 600 may manage the retention of data chunks 205. The method 600 may be performed by the processor 405.

The method 600 starts, and in one embodiment, the processor stores 605 the data chunk 205 in the data chunk database 200. The data chunk 205 may be stored 605 when the data chunk 205 is recorded in step 510 of FIG. 5A.

The processor 405 further determine 610 if the retention interval 320 is exceeded. If the retention interval 320 is not exceeded, the processor 405 continues to store 605 the data chunk 205. As a result, the data chunk 205 remains available to satisfy a query 350.

If the retention interval 320 is exceeded, the processor 405 may archive 615 the data chunk 205 and the method 600 ends. In one embodiment, the archived data chunk 205 is deleted and is not available to satisfy the query 350. Alternatively, the archived data chunk 205 may be removed from the data chunk database 200 but may remain discoverable by the processor 405. As a result, the user may intentionally employ the processor 405 to search for and discover the data chunk 205.

Figure 5C:
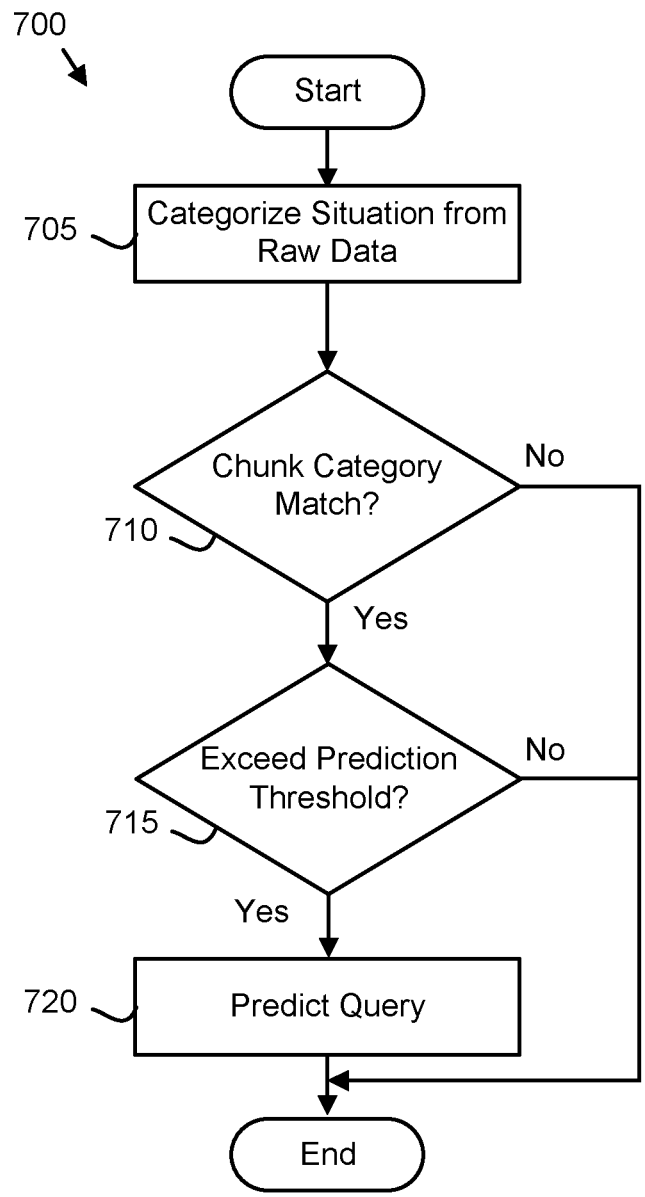
FIG. 5C is a schematic flow chart diagram illustrating one embodiment of a query prediction method.

FIG. 5C is a schematic flow chart diagram illustrating one embodiment of a query prediction method 700. The method 700 may detect the query policy 330 being satisfied. The method 700 may perform step 520 of FIG. 5A. the method 700 may be performed by the processor 405.

The method 700 starts, and in one embodiment, the processor 405 categorizes 705 a current situation in the environment of the electronic device 105 from the current raw data 305. The processor may categorize 705 the current situation by generating the current categorization 310 from the current raw data 305. In one embodiment, the processor 405 employs the neural network 475 to determine the current categorization 310.

The processor 405 may determine 710 whether a chunk category 225 of a first data chunk 205 of the plurality of data chunks 205 in the data chunk database 200 matches the current categorization 310. If no chunk category 225 matches the current categorization 310, the method 700 ends.

If the chunk category 225 for the first data chunk 205 matches the current categorization 310, the processor 405 may determine 715 if the first data chunk 205 exceeds the prediction threshold 315. The processor 405 may employ the neural network 475 to determine 715 if the data chunk 205 exceeds the prediction threshold 315. In a certain embodiment, the data chunk 205 always exceeds the prediction threshold 315.

If the data chunk 205 does not exceed the prediction threshold 315, the method 700 ends. If the data chunk 205 exceeds the prediction threshold 315, the processor 405 may predict 720 the query policy 330 being satisfied and the method 700 ends.

The embodiments detect the trigger policy 325 for a working memory event being satisfied by raw data from the sensor 120. As a result, the embodiments detect the working memory event. The embodiments further categorize a data chunk 205 for the working memory event from the raw data. The data chunk 205 may only be retained for a limited time, limiting the number of working memory events that are stored as data chunks 205. The embodiments may detect the query policy 330 being satisfied by a query 350 from subsequent raw data from the sensor 120. In response to the query policy 330 being satisfied the embodiments identify a data chunk 205 based on the query 350 and present the data chunk 205 to the user. As a result, the user is automatically reminded of working memory events. In one embodiment, the user takes no action to identify the working memory event, categorize and store the data chunk 205, formally initiate a query 350, or request the data chunk 205 be presented. Thus, the embodiments function as an automatic memory aid for the user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a sensor;
   a processor;
   a memory that stores code executable by the processor to:
   detect a trigger policy for a working memory event being satisfied by raw data from the sensor, wherein the trigger policy is based on user attention;
   record a plurality of data chunks,
   categorize the plurality of data chunks for the working memory event from the raw data;
   categorize a current categorization from the subsequent raw data;
   determine whether a chunk category of a first data chunk of the plurality of data chunks matches the current categorization;
   detect a query policy being satisfied by a query from the subsequent raw data in response to the first data chunk exceeding a prediction threshold;
   in response to the query policy being satisfied, identify the first data chunk based on the query; and
   present the first data chunk.

2. The apparatus of claim 1, wherein the trigger policy is satisfied in response to detecting a repeated phrase.

3. The apparatus of claim 1, wherein the trigger policy is satisfied in response to detecting a phrase spoken with emphasis.

4. The apparatus of claim 1, wherein the trigger policy is satisfied in response to detecting an extended visual focus.

5. The apparatus of claim 4, wherein the trigger policy is satisfied in response to detecting the extended visual focus while moving.

6. The apparatus of claim 1, wherein the query policy further is satisfied in response to detecting a query phrase.

7. The apparatus of claim 1, wherein the query policy is satisfied in response to detecting a query phrase and a chunk category.

8. A method comprising:
- detecting, by use of a processor, a trigger policy for a working memory event being satisfied by raw data, wherein the trigger policy is based on user attention;
- recording a plurality of data chunks;
- categorizing the plurality of data chunks for the working memory event from the raw data;
- categorizing a current categorization from the subsequent raw data;
- determining whether a chunk category of a first data chunk of the plurality of data chunks matches the current categorization;
- detecting a query policy being satisfied by a query from the subsequent raw data in response to the first data chunk exceeding a prediction threshold;
- in response to the query policy being satisfied, identifying the first data chunk based on the query; and
- presenting the first data chunk.

9. The method of claim 8, wherein the trigger policy is satisfied in response to detecting a repeated phrase.

10. The method of claim 8, wherein the trigger policy is satisfied in response to detecting a phrase spoken with emphasis.

11. The method of claim 8, wherein the trigger policy is satisfied in response to detecting an extended visual focus.

12. The method of claim 11, wherein the trigger policy is satisfied in response to detecting the extended visual focus while moving.

13. The method of claim 8, wherein the query policy is further satisfied in response to detecting a query phrase.

14. The method of claim 8, wherein the query policy is satisfied in response to detecting a query phrase and a chunk category.

15. A program product comprising a non-transitory computer readable storage medium that stores code executable by a processor, the executable code comprising code to:
- detect a trigger policy for a working memory event being satisfied by raw data, wherein the trigger policy is based on user attention;
- record a plurality of data chunks;
- categorize the plurality of data chunks for the working memory event from the raw data;
- categorize a current categorization from the subsequent raw data;
- determine whether a chunk category of a first data chunk of the plurality of data chunks matches the current categorization;
- detect a query policy being satisfied by a query from the subsequent raw data in response to the first date chunk exceeding a prediction threshold;
- in response to the query policy being satisfied, identify the first data chunk based on the query; and
- present the first data chunk.

16. The program product of claim 15, wherein the trigger policy is satisfied in response to detecting one or more of a repeated phrase and a phrase spoken with emphasis.

17. The program product of claim 15, wherein the trigger policy is satisfied in response to detecting one of an extended visual focus and the extended visual focus while moving.

18. The program product of claim 15, wherein the query policy is satisfied in response to detecting one of a query phrase and the query phrase and a chunk category.

* * * * *